United States Patent Office 3,411,177
Patented Nov. 19, 1968

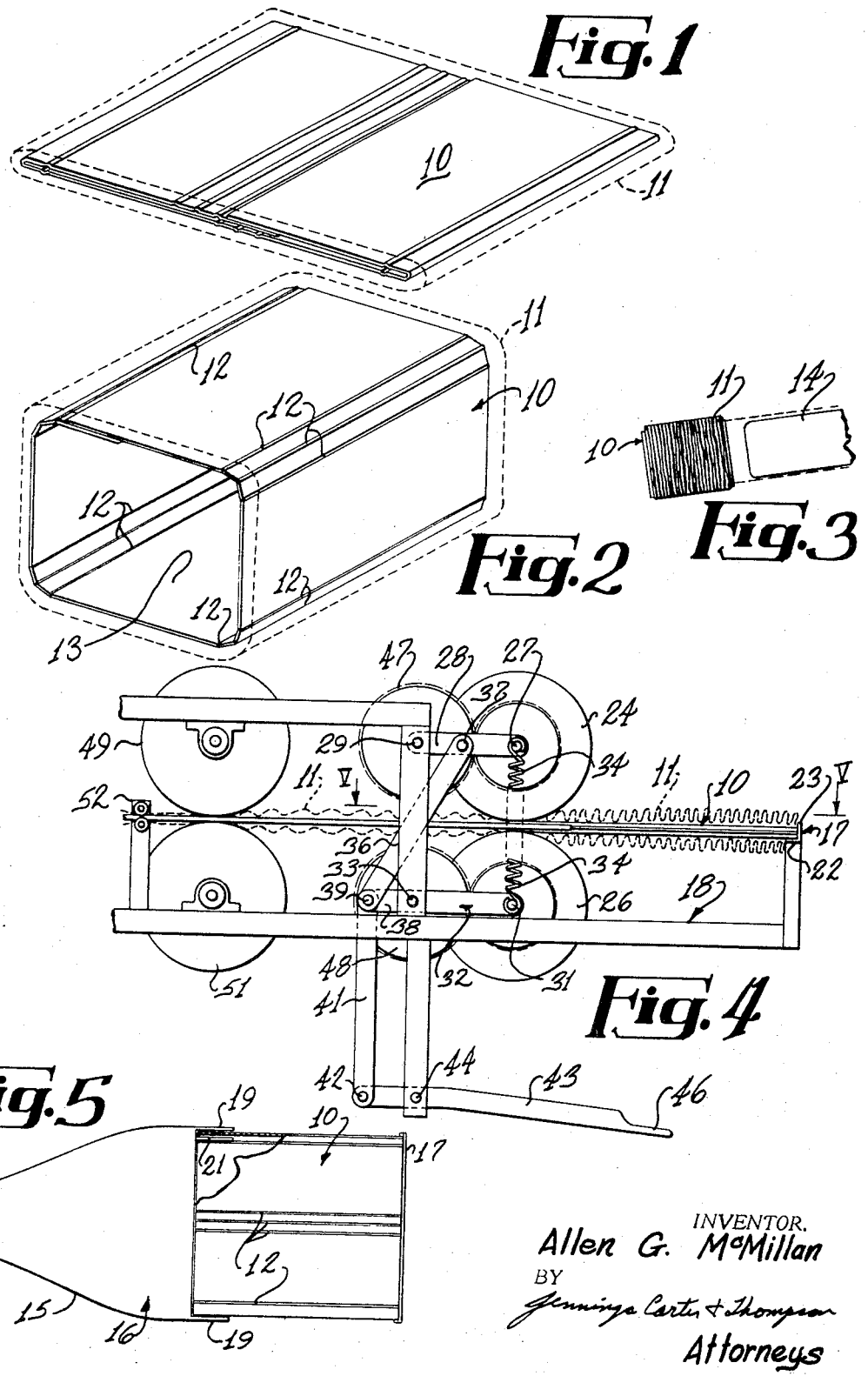

3,411,177
APPARATUS FOR SHIRRING
TUBULAR MATERIAL
Allen G. McMillan, Rte. 1, Munford, Ala. 36268
Continuation-in-part of application Ser. No. 416,402,
Dec. 6, 1964. This application July 15, 1966, Ser.
No. 565,625
9 Claims. (Cl. 17—42)

This invention relates to apparatus for shirring a tubular knitted material and package therefor and more particularly to means for handling seamless, tubular knitted material which is suitable for use on a horn as a covering for food products, such as hams and the like and is a continuation-in-part of my copending application Ser. No. 416,402, filed Dec. 6, 1964, and entitled, "Gathered Tubular Product and Process and Apparatus for Forming Same," now abandoned.

An object of my invention is to provide an apparatus which produces a product that may be stored and shipped as a compact unit and then extended for insertion over a horn which delivers the product to be covered.

Another object of my invention is to provide apparatus of the character designated which positions a gathered or shirred, tubular knitted product on a collapsed mandrel which serves a package for the product.

A further object of my invention is to provide apparatus for shirring and packaging a tubular knitted material which shall be extremely simple of construction, economical of manufacture and which requires a minimum of labor and material to package the product.

As is well known in the art to which my invention relates, tubular knitted products for use in covering or stockinetting meat products and the like have been wound on reels for shipment from the manufacturer to the packer. Also, such tubular products have been shirred in selected lengths and then positioned in receptacles therefor. This procedure not only requires a considerable amount of time and labor due to the fact that the gathered or shirred product must be removed from the container and then inserted over a horn which delivers the product to be covered. That is, the shirred product must be pulled apart whereby an opening is provided for positioning the product over the horn.

To overcome the above and other difficulties, I provide a package for a shirred, tubular knitted material which comprises a tube-like member movable from a collapsed, flat position with opposite sides thereof parallel to each other and receiving a length of shirred tubular knitted material to an extended position for insertion over a horn which delivers the product to be covered. Spaced apart, longitudinally extending scored lines are provided on the tube-like member which facilitates movement of the tube-like member to the extended position for insertion over the horn.

Apparatus embodying features of my invention is illustrated in the accompanying drawing, forming a part of this application, in which:

FIG. 1 is a perspective view showing the tube-like mandrel in collapsed position;

FIG. 2 is a perspective view showing the tube-like mandrel in extended position;

FIG. 3 is a side elevational view, drawn to a smaller scale, showing the shirred tubular knitted material on the mandrel with the mandrel extended and in position to be inserted over a horn;

FIG. 4 is a side elevational view, partly broken away, showing the apparatus for shirring and packaging the tubular, knitted material; and, FIG. 5 is a sectional view taken generally along the line V—V of FIG. 4 and drawn to a smaller scale.

Referring now to the drawing for a better understanding of my invention, I show a tube-like shirring mandrel 10 which is adapated to move from a collapsed, flat position, as shown in FIG. 1, to an extended position, as shown in FIG. 2. While in the collapsed, flat position opposite sides of the mandrel 10 extend parallel to each other, as shown in FIG. 1, for receiving the tubular, knitted material 11. In FIGS. 1 and 2, the tubular knitted material is indicated in dotted lines, for the sake of clarity. As shown in FIGS. 1, 2 and 3, spaced apart longitudinally extending scored lines 12 are provided on the tube-like mandrel so that the mandrel may be readily moved from the collapsed position to the extended position shown in FIG. 2. Preferably, three adjacent scored lines are provided at intervals about the tube-like member as shown, whereby upon moving the member 10 to extended position, as shown in FIGS. 2 and 3, an opening 13 is provided.

The tubular, knitted material is shirred and positioned on the mandrel 10 by apparatus now to be described. The tubular mandrel 10 is supported between a first support member 16 and a second support member 17 both of which are carried by a supporting frame indicated generally at 18. The support member 16 is shown as having tapered sides 15 at the receiving end thereof and a pair of spaced apart projections or fingers 19 and 21 adjacent each side thereof. The fingers 21 are adapted to be inserted inwardly of the mandrel 10 while the fingers 19 are positioned outwardly of the mandrel 10 and extend alongside the same, as shown in FIG. 5, whereby the mandrel 10 is detachably connected to the support member 16.

The support member 17 is generally L-shaped, as viewed in cross section and in end elevation, as shown in FIG. 4 to provide a horizontal supporting flange 22 and a vertical flange 23. The horizontal flange 22 thus serves as a support for the adjacent end of the mandrel 10 while the vertical flange 23 serves as a stop to limit longitudinal movement of the mandrel 10 and thus retain the mandrel in a fixed position between the support 16 and 17.

Mounted for rotation at opposite sides of the receiving end of the tube-like mandrel 10 are upper and lower feed rolls 24 and 26, respectively. The feed roll 24 is supported by a shaft 27 mounted adjacent the outer end of an arm 28. The other end of the arm 28 is pivotally connected to the frame 18 by a shaft 29. Feed roll 26 is mounted on a shaft 31 carried at one end of an arm 32. The other end of arm 32 is pivotally connected to the frame 18 by shaft 33. The shafts 27 and 31 are urged toward each other by suitable springs 34 whereby the feed rolls 24 and 26 are urged into engagement with opposite sides of the receiving end of the mandrel 10.

To move the feed rolls 24 and 26 away from each other for insertion of the mandrel into engagement with the fingers 19 and 21, a link 36 is pivotally connected at its upper end by a pivot pin 37 to an intermediate portion of arm 28. The lower end of the link 36 is pivotally connected to an outwardly extending projection 38 of arm 32 by a pivot pin 39. Also pivotally connected to the pin 39 is the upper end of a link 41 having its lower end pivotally connected by pivot pin 42 to an operating lever 43. A pivot pin 44 connects an intermediate portion of the lever 43 to a depending portion of the frame 18, as shown. The operating lever 43 is provided with a handle portion 46. It will thus be seen that upon moving the handle 46, the link 41 is lifted to thus pivot the outer ends of the arms 28 and 32 away from each other whereby the shafts 27 and 31 and their associated rolls 24 and 26 are moved away from each other for receiving the tube-like mandrel 10. Upon release of the handle 46, the springs 34 return the rolls 24 and 26 to the position shown in FIG. 4 whereby they engage opposite sides of the receiving end of the mandrel 10. Rotary motion is imparted to the feed rolls 24 and 26 by suitable gear drives or the like indicated generally at 47 and 48.

As shown in FIG. 4, upper and lower feed rolls 49 and 51, respectively are provided at opposite sides of the tubular knitted material 11 in advance of the feed rolls 24 and 26. Preferably, the feed rolls 49 and 51 are driven at a speed greater than the surface speed of the feed rolls 24 and 26 whereby the material 11 is gathered substantially prior to reaching the feed rolls 24 and 26.

A linear measuring unit 52 is mounted on the frame 18 in position to engage the tubular material 11 and indicate the length of material delivered to the mandrel 10. Accordingly, after a predetermined length of the tubular material has been delivered to the mandrel 10, the material is severed by suitable means.

From the foregoing description, the operation of my improved apparatus will be readily understood. The handle 46 is depressed whereby feed rolls 24 and 26 are urged away from each other. The tubular mandrel 10 is then inserted between the supports 16 and 17, as described hereinabove whereby the mandrel is in position to receive the tubular, knitted material 11. The tapered portion 15 of the support member 16 facilitates movement of the material 11 onto the mandrel 10, for receiving the horn, indicated at 14, which delivers the products to be covered, such as hams and the like. With the handle 46 released, the springs 34 urge the rolls 24 and 26 into engagement with the tubular material 11 adjacent the receiving end of the mandrel 10 whereby the tubular material 11 is delivered to the mandrel until the linear measuring unit 52 indicates that a predetermined length of material has been delivered. The tubular material 11 is then severed by suitable means. To remove the mandrel 10, the handle 46 is depressed to thus urge feed rolls 24 and 26 away from each other whereby the mandrel 10 carrying the gathered material 11 thereon may be lifted out of the apparatus.

From the foregoing it will be seen that I have devised an improved apparatus for shirring a tubular knitted material and a package therefor. By placing the shirred material 11 on the collapsed mandrel 10, I provide a finished package which is relatively flat and requires a minimum of space for storage and shipping. Also, by providing the scored lines 12 longitudinally of the mandrel 10 and at spaced intervals, the tubular mandrel 10 may be readily moved to extended position, as shown in FIGS. 2 and 3 whereby the mandrel may be positioned over a horn which delivers the product to be covered. The mandrel 10 may remain on the horn 14 or the gathered material 11 may be forced off the mandrel onto the horn 14 whereby the material is then employed to cover a food product, such as a ham and the like, in a manner well understood in the art.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

I claim:

1. In apparatus for shirring and packaging a tubular knitted material suitable for use on a horn as a covering for food products:
    (a) a tube-like shirring mandrel disposed to move from a collapsed flat position with opposite sides thereof parallel to each other for receiving said tubular knitted material to an extended position for insertion over a horn which delivers the products to be covered,
    (b) means supporting said tube-like mandrel in said collapsed flat position for receiving the tubular knitted material,
    (c) means successively engaging a portion of said tubular knitted material and feeding the same onto one end of said tube-like mandrel, and
    (d) stop means adjacent the other end of said tube-like mandrel limiting longitudinal movement of said tubular knitted material relative to said other end.

2. In apparatus for shirring and packaging a tubular knitted material as defined in claim 1 in which the means supporting said tube-like mandrel in said collapsed flat position comprises:
    (a) a first support member in position to support said other end of the tube-like mandrel and limit longitudinal movement thereof,
    (b) a second support member with one end thereof extending inwardly of said tubular knitted material and having at least one projection at the other end thereof disposed to extend inwardly of said one end of the tube-like mandrel to detachably connect said second support member to said tube-like mandrel whereby said tubular knitted material is introduced onto said tube-like mandrel.

3. In apparatus for shirring and packaging a tubular knitted material as defined in claim 2 in which said second support member is provided with a pair of spaced apart projections at each side thereof in position for one projection of each pair to extend inwardly of said tube-like mandrel with the other projection of each pair extending outwardly of and alongside said tube-like mandrel.

4. In apparatus for shirring and packaging a tubular knitted material as defined in claim 2 in which said first support member is generally L-shaped as viewed in cross section with the horizontal leg thereof disposed to support said other end of the tube-like mandrel and the vertical leg thereof defining a stop member.

5. In apparatus for shirring and packaging a tubular knitted material as defined in claim 1 in which the means successively engaging a portion of said tubular knitted material and feeding the same onto one end of the tube-like mandrel comprises feed rolls mounted at opposite sides of said tube-like mandrel adjacent said one end of the mandrel.

6. In apparatus for shirring and packaging a tubular knitted material as defined in claim 5 in which actuating means is operatively connected to said feed rolls to urge said feed rolls selectively toward and away from said tube-like mandrel.

7. In apparatus for shirring and packaging a tubular knitted material as defined in claim 5 in which a second pair of feed rolls is mounted at opposite sides of said tubular knitted material in spaced relation to and in advance of said feed rolls mounted at opposite sides of said tube-like mandrel.

8. In apparatus for shirring and packaging a tubular knitted material as defined in claim 7 in which the rolls of said second pair of feed rolls are driven at a surface speed greater than the surface speed of said feed rolls mounted at opposite sides of said tube-like mandrel.

9. In apparatus for shirring and packaging a tubular knitted material as defined in claim 1 in which a linear measuring unit is mounted in position to indicate the length of material delivered to said mandrel so that a predetermined length of the tubular material is positioned on the mandrel.

References Cited

UNITED STATES PATENTS

| | | | |
|---|---|---|---|
| 1,761,189 | 6/1930 | Brennan | 17—42 |
| 2,646,592 | 7/1953 | Kennedy | 17—42 |
| 2,819,488 | 1/1958 | Gimbel | 17—42 |
| 3,148,991 | 9/1964 | Svendsen | 17—45 X |

FOREIGN PATENTS 210,308   7/1960   Austria.

LUCIE H. LAUDENSLAGER, *Primary Examiner.*